US008876275B2

(12) United States Patent
Kanasugi et al.

(10) Patent No.: US 8,876,275 B2
(45) Date of Patent: Nov. 4, 2014

(54) TRANSFER INK JET RECORDING METHOD

(71) Applicant: Canon Kabushiki Kaisha, Tokyo (JP)

(72) Inventors: Yuichiro Kanasugi, Tokyo (JP); Shinsuke Tsuji, Kawasaki (JP); Yoshitaka Torisaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 13/710,243

(22) Filed: Dec. 10, 2012

(65) Prior Publication Data

US 2013/0147889 A1 Jun. 13, 2013

(30) Foreign Application Priority Data

Dec. 12, 2011 (JP) ................................ 2011-271677

(51) Int. Cl.
*C09D 11/00* (2014.01)
*B41J 2/005* (2006.01)
*B41J 2/01* (2006.01)

(52) U.S. Cl.
CPC .......... *B41J 2/0057* (2013.01); *B41J 2002/012* (2013.01); *B41J 2/01* (2013.01)
USPC .......................................................... 347/100

(58) Field of Classification Search
USPC .......................................................... 347/100
See application file for complete search history.

(56) References Cited

U.S. PATENT DOCUMENTS

2008/0303885 A1* 12/2008 Jung ............................ 347/100
2013/0115431 A1* 5/2013 Aoyama et al. ............ 428/195.1

FOREIGN PATENT DOCUMENTS

JP 2009-234219 A 10/2009

* cited by examiner

*Primary Examiner* — Laura Martin
(74) *Attorney, Agent, or Firm* — Canon U.S.A., Inc., IP Division

(57) ABSTRACT

An image recording method includes applying a liquid composition containing a reaction agent to a region of an intermediate transfer member, applying an ink containing a coloring material to at least part of the region to form an intermediate image, and transferring the intermediate image to a recording medium. The intermediate transfer member has a surface on which water forms a contact angle of 40 degrees or more with the surface. The reaction agent precipitates or aggregates the coloring material. The liquid composition has a pH of 6.0 or less and contains a polyether siloxane compound expressed by the following general formula:

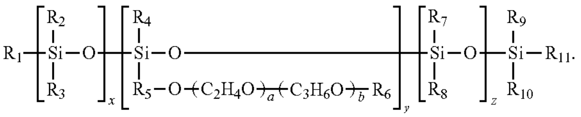

4 Claims, 1 Drawing Sheet

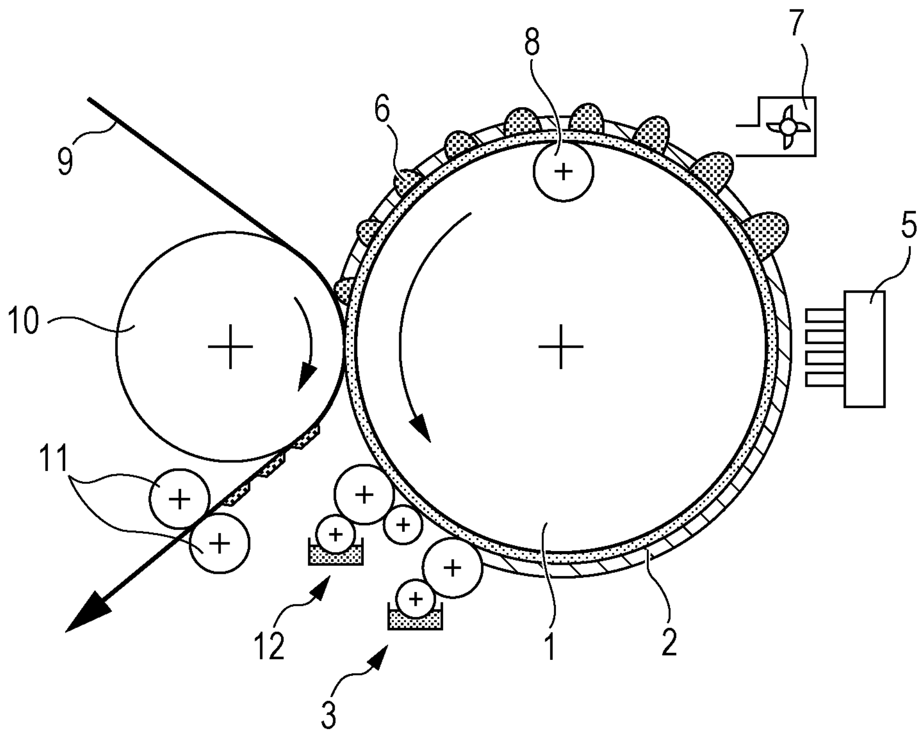
8
7
6
9
5
10
11
12
1
2
3

TRANSFER INK JET RECORDING METHOD

BACKGROUND OF THE INVENTION

1. Field of the Invention

The present invention relates to an image recording method.

2. Description of the Related Art

In an image recording method (hereinafter referred to as intermediate transfer image recording method) in which an image is recorded by transferring to a recording medium an intermediate image formed by applying an ink to an intermediate transfer member, it has been known that a liquid composition containing a reaction agent capable of precipitating or aggregating the coloring material in the ink when the composition has come into contact with the ink is applied to the intermediate transfer member before forming the intermediate image. Also, it has been known that the releasability of the intermediate transfer member is increased to enhance the certainty of transfer (hereinafter referred to as transfer certainty) in the intermediate transfer image recording method. In order to enhance the releasability, the intermediate transfer member may be formed of a releasable material, or a liquid that can enhance releasability may be applied to the intermediate transfer member.

However, when a liquid composition is applied to an intermediate transfer member whose releasability has been enhanced by such a method, the liquid composition, in some cases, may be repelled from the intermediate transfer member and result in a non-uniform coating. If an ink is applied to an intermediate transfer member non-uniformly coated with a liquid composition, the coloring material is not uniformly precipitated or aggregated. Accordingly, the intermediate image becomes non-uniform in density, and the image quality of the image transferred to the recording medium is degraded.

In Japanese Patent Laid-Open No. 2009-234219, a method is discussed for uniformly applying a liquid composition to a highly releasable intermediate transfer member. This patent document teaches that the image quality of the image transferred to a recording medium is improved by uniformly applying to an intermediate transfer member a liquid composition containing a specific fluorine-containing anionic surfactant so as to have a high wettability to the intermediate transfer member.

According to a study of the present inventors, however, the method disclosed in the above-cited patent document has some disadvantages in high-speed recording, while a satisfactory intermediate image can be formed because the liquid composition can be uniformly applied. More specifically, the intermediate image cannot be certainly transferred in a high-speed recording process, and may remain partially on the intermediate transfer member. Consequently, the image quality of the image transferred to the recording medium can be degraded.

SUMMARY OF THE INVENTION

The present invention provides an intermediate transfer image recording method in which an intermediate image less non-uniform in density is formed by uniformly applying a liquid composition to an intermediate transfer member, and in which the intermediate image can be certainly transferred in high-speed recording processes.

Accordingly, an image recording method is provided which includes applying a liquid composition containing a reaction agent that will precipitate or aggregate a coloring material in an ink to a region of an intermediate transfer member, applying the ink to at least part of the region to form an intermediate image, and transferring the intermediate image to a recording medium. The intermediate transfer member has a surface on which water forms a contact angle of 40 degrees or more with the surface. The liquid composition has a pH of 6.0 or less, and contains a polyether siloxane compound expressed by the following general formula:

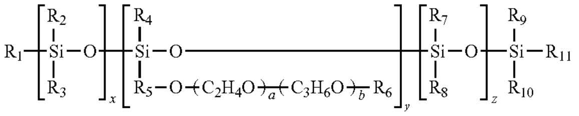

In the formula, $R_1$ to $R_4$ and $R_6$ to $R_{11}$ each represent hydrogen or an organic group, and $R_5$ represents an organic group. x, y And a each represent an integer of 1 or more, and z and b each represent an integer of 0 or more.

In the image recording method, an intermediate image less non-uniform in density is formed by uniformly applying a liquid composition to an intermediate transfer member, and the intermediate image can be certainly transferred in high-speed recording processes.

Further features of the present invention will become apparent from the following description of exemplary embodiments with reference to the attached drawing.

BRIEF DESCRIPTION OF THE DRAWING

FIGURE is a schematic sectional view of a recording apparatus used in an embodiment of the present invention.

DESCRIPTION OF THE EMBODIMENTS

The applicants of the present invention found that an intermediate transfer member having a surface showing incompatible properties, releasability and wettability, can be achieved by applying a liquid composition having the following features to the surface.

More specifically, in the intermediate transfer recording method according to embodiments of the invention, the intermediate transfer member and the liquid composition satisfy the following three requirements:

The intermediate transfer member has a surface on which water shows a contact angle of 40 degrees or more;

The liquid composition has a pH of 6.0 or less; and

The liquid composition contains a compound expressed by the following general formula:

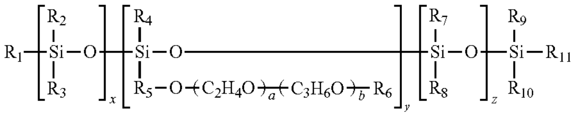

In the formula, $R_1$ to $R_4$ and $R_6$ to $R_{11}$ each represent hydrogen or an organic group, and $R_5$ represents an organic group. x, y And a each represent an integer of 1 or more, and z and b each represent an integer of 0 or more.

When these requirements are satisfied, the surface coated with the liquid composition exhibits an appropriate releasability and an appropriate wettability. Accordingly, a high-quality intermediate image can be formed on the surface of the intermediate transfer member, and the intermediate image can be certainly transferred to a recording medium.

FIGURE is a schematic sectional view of a recording apparatus used in an embodiment of the present invention. In FIGURE, the intermediate transfer member includes a base layer 1 and a surface layer 2. A unit is disposed around the intermediate transfer member for a basic process, including a liquid composition applicator 3 that applies the liquid composition, an ink jet head 5 that forms an intermediate image 6, and a transfer roller 10 that transfers the intermediate image 6 to a recording medium. A solvent remover 7 and a heater 8 may be provided between the ink jet head 5 and the transfer roller 10 so as to reduce the solvent in the ink applied at a short time. A cleaner 12 may be provided between the transfer roller 10 and the liquid composition applicator 3 so as to remove the ink remaining on the intermediate transfer member after transfer. Also, a fixing roller 11 may be provided for fixing the image transferred to the recording medium 9 at a short time.

The intermediate transfer member rotates in the direction indicated by an arrow in the FIGURE, and to which the liquid composition is applied by the liquid composition applicator 3. Subsequently, an intermediate image 6 is formed by applying inks from the ink jet head 5, which has a plurality of nozzles corresponding to a plurality of colors, according to image data. The intermediate image 6 is adjusted to a viscosity suitable for being transferred by the solvent remover 7 and the heater 8, so that the intermediate image 6 can be more certainly transferred. Then, the intermediate image 6 is transferred to the recording medium 9 by the transfer roller 10. After the transfer, the surface of the intermediate transfer member is cleaned by the cleaner 12. The sequence of the above-described operations is repeated by rotating the intermediate transfer member, and thus, images are repeatedly recorded on the recording medium 9.

The intermediate transfer member can be of a roller or a belt. From the viewpoint of desired properties of the intermediate transfer member, including high dimensional precision, reduced rotational inertia, and such a rigidity as can be resistant to the pressure applied for transfer, the intermediate transfer member is of a drum made of, for example, an aluminum alloy or any other light metal. As described above, the intermediate transfer member of an embodiment may include a base layer and a surface layer.

In embodiments of the invention, the intermediate transfer member has a surface on which water shows a contact angle of 40 degrees or more. The term “contact angle” used herein refers to a “static contact angle”. The contact angle can be measured with, for example, a contact angle meter (CA-V, manufactured by Kyowa Interface Science).

The intermediate transfer member satisfying this requirement exhibits a releasability appropriate to intermediate images, and consequently, the intermediate images can be more certainly transferred. The term “releasability” used herein refers to a property of a surface showing how easily the component of an ink or a liquid composition separates from the surface. If the contact angle of water is excessively high, the intermediate image is liable to be rejected. Accordingly, the contact angle is preferably 120 degrees or less, and more preferably 105 degrees or less.

Since the surface of the intermediate transfer member is used for transferring an image to a recording medium such as paper by pressing the image on the recording medium, the surface is desirably elastic to some extent. For example, when paper sheet is used as the recording medium, it is desirable that the surface layer of the intermediate transfer member have an elasticity corresponding to a type A durometer hardness of 10° to 100°, preferably 20° to 60° (in accordance with JIS K 6253).

The surface of the intermediate transfer member can be made of any desired material, such as polymer, ceramic, or metal. In an embodiment, a rubber or an elastomer may be used from the viewpoint of the above-described properties and workability. Examples of the rubber and elastomer include polybutadiene rubbers, nitrile rubbers, chloroprene rubbers, silicone rubbers, fluorocarbon rubbers, fluorosilicone rubbers, urethane rubbers, styrene elastomers, olefin elastomers, vinyl chloride elastomers, ester elastomers, and amide elastomers. Alternatively, the surface may be made of other materials such as polyether, polyester, polystyrene, polycarbonate, siloxane compounds, and perfluorocarbon compounds. Silicone rubbers, fluorosilicone rubbers, phenyl silicone rubbers, siloxane compounds prepared from a hydrolyzable organosilicon compound, or the like can form a surface on which water shows a desired contact angle, without performing surface treatment as will be described later.

If the intermediate transfer member includes a base layer and a surface layer, the surface layer may include a plurality of layers made of different materials. Examples of such a multilayer material include a urethane rubber endless belt coated with silicone rubber, a sheet of PET film coated with a silicone rubber layer, and a urethane rubber sheet covered with a film of a siloxane compound. The siloxane compound can be a condensate produced from a hydrolyzable organosilicon compound. A sheet may be used which is made of a woven base cloth of cotton, polyester, rayon or the like, impregnated with a rubber material such as nitrile-butadiene rubber or urethane rubber.

The surface of the intermediate transfer member may be subjected to an appropriate surface treatment. Examples of such surface treatment include frame treatment, corona treatment, plasma treatment, grinding, roughening, active energy ray (UV, IR, RF, etc.) irradiation, ozonization, surfactant treatment, and silane coupling. A plurality of surface treatment operations may be performed in combination.

From the viewpoint of preventing the intermediate image on the intermediate transfer member from flowing, it is desirable that the intermediate transfer member have a rough surface. More specifically, the surface of the intermediate transfer member has an average surface roughness Ra of, for example, 0.01 to 3 μm.

The intermediate transfer image recording method of an embodiment may broadly include the following four steps (a) to (d). The steps will be described below.

(a) Applying Liquid Composition

In the step of applying a liquid composition, a liquid composition containing a reaction agent is applied to an intermediate transfer member with a liquid composition applicator 3. In the embodiment shown in FIGURE, a roll coater is used as the liquid composition applicator 3. Other types of applicator, such as a spray coater and a slit coater, may be used without particular limitation.

The reaction agent used herein refers to a substance that will precipitate or aggregate the coloring material in the ink when the intermediate transfer member comes into contact with the ink. More specifically, when a dye is used as the coloring material of an ink, the dye dissolved in the ink is precipitated by a reaction with the reaction agent. When a pigment is used as the coloring material, the pigment dispersed in the ink is aggregated by a reaction with the reaction agent. Consequently, the viscosity of the ink is increased so that the intermediate image can be stably held on the intermediate transfer member. The reaction agent may be a polyvalent metal ion or an organic acid. Since organic acids can react with the coloring material in the ink at a high speed, an organic acid may be advantageously used in an embodiment.

Examples of the polyvalent metal ion include divalent metal ions, such as $Ca^{2+}$, $Cu^{2+}$, $Ni^{2+}$, $Mg^{2+}$, and $Zn^{2+}$, and trivalent metal ions, such as $Fe^{3+}$ and $Al^{3+}$. These may be used singly or in combination. The polyvalent metal ion can be added in the form of a salt to the liquid composition. Counter ions to form a salt with the polyvalent ion include $Cl^-$, $NO_3^-$, $SO_4^{2-}$, $I^-$, $Br^-$, $ClO_3^-$, and $RCOO^-$ (R represents an alkyl having a carbon number of 1 to 20). The polyvalent ion content can be in the range of 5.0% to 70.0% by mass relative to the total mass of the liquid composition.

A known organic acid can be used as the organic acid of the reaction agent. For example, organic carboxylic acid or organic sulfonic acid may be used. More specifically, exemplary organic acids include polyacrylic acid, acetic acid, methanesulfonic acid, glycolic acid, malonic acid, malic acid, maleic acid, ascorbic acid, succinic acid, glutaric acid, fumaric acid, citric acid, tartaric acid, lactic acid, sulfonic acid, levulinic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, and salts and derivatives of these acids. Levulinic acid is difficult to precipitate from the liquid composition and is therefore suitable in view of the storage stability of the liquid composition. These compounds may be used singly or in combination. The organic acid content can be in the range of 5.0% to 90.0% by mass relative to the total mass of the liquid composition.

When an organic acid is used as the reaction agent, the pH of the liquid composition is preferably 4.0 or less. More preferably, the pH of the liquid composition is in the range of 1.0 to 3.5, and particularly in the range of 1.0 to 3.0.

In embodiments of the present invention, the liquid composition has a pH of 6.0 or less.

As will be described later, the composition expressed by the general formula imparts an appropriate wettability to the surface of the intermediate transfer member when being regularly oriented on the surface. According to a study of the present inventors, the compound expressed by the general formula can be regularly oriented when the liquid composition has a pH of 6.0 or less. More preferably, the pH of the liquid composition is 4.0 or less. Also, the pH of the liquid composition is preferably 1.0 or more.

In embodiments of the present invention, the liquid composition contains a compound expressed by the following general formula:

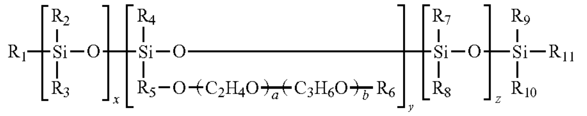

In the general formula, $R_1$ to $R_4$ and $R_6$ to $R_{11}$ each represent hydrogen or an organic group, and $R_5$ represents an organic group. x, y And a each represent an integer of 1 or more, and z and b each represent an integer of 0 or more.

In the above general formula, the polyalkyl oxide skeleton of the side chain includes an ethylene oxide unit ($C_2H_4O$) and a propylene oxide unit ($C_3H_6O$). The ethylene oxide unit and the propylene oxide unit in the compound of the general formula may be in a state of random copolymer in which ethylene oxide units and propylene oxide units are randomly arranged, or in a state of a block copolymer in which a repetitive structure of the ethylene oxide unit and a repetitive structure of the propylene oxide unit are connected.

The compound expressed by the general formula, which is a side-chain siloxane compound, can impart incompatible properties, releasability and wettability, to the intermediate transfer member by function separation between the main chain polysiloxane skeleton and the side chain polyalkyl oxide skeleton. More specifically, it is expected that the side chain polyalkyl oxide skeleton exhibits an appropriate wettability, and that the main chain polysiloxane skeleton exhibits an appropriate releasability. The importance in imparting incompatible properties together is that a polysiloxane skeleton and a polyalkyl oxide skeleton are present as the main chain and a side chain, respectively. If, for example, the main chain has both a polysiloxane skeleton and a polyalkyl oxide skeleton, either property cannot be exhibited.

In the general formula, $R_1$ to $R_4$ and $R_7$ to $R_{11}$, which are each hydrogen or an organic group, can each be a hydrocarbon group, such as an alkyl group having a carbon number of 1 to 10. The alkyl group can be a methyl group. $R_5$ is an organic group, and can be a hydrocarbon group, such as an alkylene group having a carbon number of 1 to 10. The alkylene group can be an ethylene group, a propylene group, or a butylene group. $R_6$ is hydrogen or an organic group, and can be a hydrocarbon group having a carbon number of 1 to 10. Each of the organic groups of $R_1$ to $R_{11}$ may have a substituent. Exemplary substituents include a hydrocarbon group, a hydroxy group, and an alkoxy group.

In the general formula, x can be an integer in the range of 1 to 500, preferably 1 to 100, and more preferably 1 to 10. y Can be an integer in the range of 1 to 100, preferably 1 to 50. z Can be an integer in the range of 0 to 500, preferably 0 to 100, and more preferably 0 to 10. a Can be an integer in the range of 1 to 500, preferably 1 to 100. b Can be an integer in the range of 0 to 500, preferably 0 to 100.

The polystyrene-equivalent weight average molecular weight, measured by gel permeation chromatography, of the compound of the general formula is preferably 10,000 or less and 500 or more. If the weight average molecular weight exceeds 10,000, the intermediate transfer member may not exhibit a sufficient wettability. If the weight average molecular weight is less than 500, the compound may not sufficiently impart releasability. Since the compound expressed by the general formula is in a state of a mixture of those having various molecular weights, it is appropriate that the molecular weight of the composition is represented by the average molecular weight.

The content of the compound of the general formula in the liquid composition is preferably 3.0% by mass or more, and more preferably 10.0% by mass or more. Also, the content of the general formula is preferably 75.0% by mass or less, and more preferably 70.0% by mass or less. If the compound content is less than 3.0% by mass, the intermediate transfer member may not exhibit a sufficient wettability. If the compound content exceeds 75.0% by mass, the reaction agent content is relatively reduced, and accordingly, the color material may not be sufficiently precipitated or aggregated.

The compound of the general formula may be present in a dissolved state or a dispersed state in the liquid composition. Alternatively, it may be present in a mixture of a dissolved state and a dispersed state.

Examples of the compound expressed by the general formula include BYK 347, BYK 348, BYK 349, BYK 331, BYK 307, and BYK 3455 (each produced by BYK).

From the viewpoint of the fastness of the image transferred to a recording medium, the liquid composition may further contain a resin. Any resin can be added as long as it can coexist with the reaction agent and the compound of the general formula.

The amount of the liquid composition to be applied to the intermediate transfer member can be 0.1 $g/m^2$ or more and 5.0 $g/m^2$ or less. If the amount of the applied liquid composition is less than 0.1 $g/m^2$, the amount of the reaction agent can be too small to sufficiently precipitate or aggregate the coloring material. If the amount of the applied liquid composition exceeds 5.0 $g/m^2$, the proportion of the liquid composition in the intermediate image is increased, the intermediate image is liable to flow. Consequently, the resulting image may exhibit an unsatisfactory quality.

(b) Forming Intermediate Image

An ink of a desired color was ejected from the ink jet head 5 onto the intermediate transfer member coated with the liquid composition, according to image data. The ink reacts with the reaction agent in the coating of the liquid composition before step (b), so that the viscosity of the ink is increased. The intermediate image can be the mirror-reversed image of a final image that will be recorded on a recording medium.

Composition of the Ink

In embodiments of the present invention, the ink is not particularly limited and may contain known constituents. The composition of the ink will be described below.

Coloring Material

The coloring material in the ink can be a known pigment or dye. From the viewpoint of the fastness of the resulting image, a pigment may be used as the coloring material. Pigments include self-dispersing pigments and resin-dispersed pigments. The pigment used in embodiments of the present invention may be an inorganic pigment or an organic pigment. More specifically, pigments designated by color index (C.I.) numbers can be used. In particular, carbon black is suitable for a black ink from the viewpoint of the fastness of the image. The pigment content in the ink can be 0.5% by mass or more, and preferably 1.0% by mass or more. Also, it can be 15.0% by mass or less, and preferably 10.0% by mass or less.

When a resin-dispersed pigment is used as the coloring material, a resin dispersant including a hydrophilic portion and a hydrophobic portion can be used to disperse the pigment. For example, a copolymer of a hydrophilic monomer and a hydrophobic monomer can be used.

Hydrophobic monomers include styrene, styrene derivatives, alkyl (meta)acrylate, and benzyl (meta)acrylate. Hydrophilic monomers include acrylic acid, methacrylic acid, and maleic acid.

The resin dispersant has an acid value, preferably, in the range of 50 to 550 mg KOH/g. The weight average molecular weight of the resin dispersant is preferably in the range of 1,000 to 50,000.

The resin dispersant content in the ink can be 0.1 to 3 times of the pigment content.

Resin Particles

The ink may contain resin particles from the viewpoint of image quality and fixity. Known resin particles that have been used in inks can be used as needed. Exemplary materials of the resin particles include homopolymers, such as polyolefin, polystyrene, polyurethane, polyester, polyether, polyurea, polyamide, polyvinyl alcohol, poly(meta)acrylic acids and their salts, polyalkyl (meta)acrylates, and polydiene; and copolymers of these homopolymers.

The resin of the resin particles has a weight average molecular weight, preferably, in the range of 1,000 to 2,000,000. The resin particle content can be 1.0% by mass or more relative to the total mass of the ink, and preferably 2.0% by mass or more. Also, the resin particle content can be 50.0% by mass or less, and preferably 40.0% by mass or less.

The resin particles can be dispersed in the ink and thus be present as a dispersion of the resin particles. The resin particles can be dispersed by any method, and a dispersion of self-dispersing resin particles can be used which is prepared using a resin having a hydrophilic group. Examples of the hydrophilic group include carboxy, sulfonate and phosphate groups. The resin having a hydrophilic group may be prepared by polymerizing acrylic acid, methacrylic acid, or the like. Alternatively, a resin particle dispersion may be used which is prepared by dispersing resin particles with an emulsifier. In this instance, the emulsifier can be a known surfactant. A nonionic surfactant or a surfactant having the same charge as the resin particles can be used.

The volume average particle size of the resin particles is preferably 10 nm or more, and more preferably 100 nm or more. Also, it is preferably 1000 nm or less, and more preferably 500 nm or less. The volume average particle size can be measured by dynamic light scattering.

For preparing the resin particle dispersion, an additive may be added to stabilize the dispersion of the resin particles. Examples of the additive include n-hexadecane, dodecyl methacrylate, stearyl methacrylate, chlorobenzene, dodecyl mercaptan, olive oil, blue dye (Blue 70), and polymethyl methacrylate.

Surfactant

The ink may contain a surfactant. More specifically, Acetylenol AE 100 (produced by Kawaken Fine Chemicals) may be used. The surfactant content in the ink can be in the range of 0.01% to 5.0% by mass relative to the total mass of the ink.

Solvent

The ink may contain a solvent. The solvent may be water and/or a water-soluble organic solvent. The water can be ion-exchanged water. The water content in the ink can be in the range of 30% to 97% by mass relative to the total mass of the ink.

Examples of the water-soluble organic solvent include glycerol, diethylene glycol, polyethylene glycol, and 2-pyrrolidone. The content of the water-soluble organic solvent in the ink can be in the range of 3% to 70% by mass relative to the total mass of the ink.

Other Additives

The ink may further contain other additives, such as a pH adjuster, a rust preventive, a preservative, a fungicide, an antioxidant, an antireductant, water-soluble resin, and a viscosity modifier, as needed.

(c) Removing Solvent

After the step of formation of the intermediate image, and before the step of transferring the intermediate image, the solvent in the intermediate image on the intermediate transfer member may be removed. By removing the solvent, the viscosity of the intermediate image is increased, so that the transfer certainty can be increased.

For removing the solvent, any known technique used in intermediate transfer image forming methods can be used. For example, the solvent may be removed by heating, blowing low-humidity air, or reducing pressure. These techniques may be combined.

(d) Transferring Intermediate Image

In the step of transferring the intermediate image, the intermediate image is transferred to a recording medium. The recording medium may be, but is not limited to, a printing paper sheet or a film.

An appropriate pressure can be applied to the recording medium that has come into contact with the intermediate image. More specifically, a pressure may be applied with a roller or any other member that can operate simultaneously with the rotation of the intermediate transfer member, or may be instantaneously applied with a pressuring member that is disposed so as to oppose the intermediate transfer member and reciprocally moves in the direction perpendicular to the intermediate transfer member. The time of pressure application can be in the range of 1 to 100,000 ms.

EXAMPLES

Example 1

Examples of the present invention and comparative examples will be described below. In the following description, "part(s)" and "%" are on a mass basis unless otherwise specified. In the measurement of the contact angle of water on the surface of the intermediate transfer member, the static contact angle between the intermediate transfer member and an ink droplet was measured with a contact angle meter (CA-V, manufactured by Kyowa Interface Science).

(a) Applying Liquid Composition

Preparation of Intermediate Transfer Member 1

In Example 1, an intermediate transfer member 1 was prepared by coating a silicone rubber member with a surface layer, having a thickness of about 0.7 μm, of a siloxane compound produced from a hydrolyzable organosilicon compound.

The surface layer of the siloxane compound was formed as below. First, glycidoxypropyltriethoxysilane and methyltriethoxysilane were mixed in a molar ratio of 1:1. The mixture was heated to reflux for 24 hours in the presence of hydrochloric acid as a catalyst in a water-soluble solvent, and thus a hydrolyzable condensate solution was obtained. The hydrolyzable condensate solution was diluted to a concentration of 15% by mass with methyl isobutyl ketone, and then 5% by mass of a photo cationic polymerization initiator SP 150 (produced by ADEKA) was added to yield a coating liquid. The coating liquid was applied to a silicon rubber member whose surface had been subjected to plasma treatment to enhance the coatability and adhesion, and the coating on the silicon rubber member was exposed to UV light and then heated at 125° C. for 3 hours to yield the surface layer. Thus, the surface layer of a siloxane compound formed on the silicone rubber member was able to form a contact angle of 50 degree with water, as shown in Table 3.

Preparation of Liquid Composition 1

Liquid Composition 1 used in Example 1 was prepared by mixing the following constituents. The pH of liquid composition 1 was 2.0.

Levulinic acid: 40 parts

Surfactant 1, side-chain polyether-modified siloxane (BYK 347 produced by BYK, molecular weight: 1500): 30 parts 1,5-Pentanediol: 5 parts Ion-exchanged water: 25 parts Liquid Composition 1 was applied at an application rate of 0.8 g/m$^2$ to the entire surface of the intermediate transfer member including the region to which an ink would be applied, using a roll coater.

(b) Forming Intermediate Image

Subsequently, an ink was applied to the intermediate transfer member by ejecting the ink from the ink jet head 5 so as to form a solid image at a recording duty of 100%, thus forming an intermediate image. In Example 1, the ink jet head was of a line head that ejects ink on demand, using an electrothermal conversion element.

Preparation of Ink 1

The Example 1, an ink was prepared by mixing a pigment dispersion liquid and a resin particle dispersion that had been prepared separately.

Preparation of Black Pigment Dispersion Liquid

A batch type vertical sand mill (manufactured by Aimex) was charged with a mixture of 10 parts of carbon black (product name: Monarch 1100, produced by Cabot), 15 parts of pigment dispersant solution (containing styrene-ethyl acrylate-acrylic acid copolymer (acid value: 150, weight average molecular weight: 8,000) and 20% of solid) neutralized with potassium hydroxide, and 75 parts of pure water, and the materials were dispersed with 200 parts of zirconia beads of 0.3 mm in diameter for 5 hours while being cooled with water. The resulting dispersion liquid was centrifuged to remove coarse particles, and thus a black pigment dispersion liquid containing about 10% by mass of pigment was prepared.

Preparation of Resin Particle Dispersion

The mixture of 18 parts of ethyl methacrylate, 2 parts of 2,2'-azobis-(2-methylbutyronitrile), and 2 parts of n-hexadecane was stirred for 0.5 hour. The mixture was dropped to 78 parts of 6% aqueous solution of NIKKOL BC 20 (emulsifier, produced by Nikko Chemicals), followed by stirring for 0.5 hour. Then, the resulting mixture was subjected to supersonic wave irradiation for 3 hours. Subsequently, the mixture was subjected to a polymerization reaction for 3 hours in a nitrogen atmosphere at 85° C., followed by cooling at room temperature. The reaction product was filtered to yield a dispersion of about 20% by mass of resin particles. The weight average molecular weight of the resin particles was about 1,100,000, and the dispersed particles have a particle size of about 140 nm.

Preparation of Ink

An ink was prepared by mixing the above-described black pigment dispersion liquid and resin particle dispersion, and other constituents below in the following proportion:

Black pigment dispersion liquid: 20%

Resin particle dispersion: 50%

Diethylene glycol: 10%

Acetylenol AE 100:1%

Ion-exchanged water: 19%

After sufficiently stirring the mixture of the above materials, the mixture was subjected to pressure filtration through a microfilter of 3.0 μm in pore size (produced by Fujifilm Corporation) to yield a black ink.

(c) Removing Solvent

In Example 1, after the formation of an intermediate image, the intermediate image was dried to adjust the viscosity of the ink of the intermediate image by heating with a heater and blowing with a blower, and was then transferred. The blower blew warm air of 25° C. for 50 s to volatilize an appropriate amount of solvent in the intermediate image. The heater temperature was set to 50° C.

(d) Transferring Intermediate Image

Then, the intermediate image on the intermediate transfer member was transferred to a recording medium 18 by bringing the intermediate image into contact with the recording medium 18 with the transfer roller 10. At this time, the pressure for transfer was applied for 10 ms (conveying speed: 1 m/s, roller nip length: 10 mm), and printing paper (product name: Aurora Coat, 127.9 g/m$^2$, manufactured by Nippon Paper Industries) was used as the recording medium. Although in the Example 1, a rolled long sheet was used as the recording medium, sheets cut into a prescribed shape may be used.

Examples 2 to 14, Comparative Examples 1 to 4

Preparation of Liquid Compositions 2 to 12 and Comparative Liquid Compositions 1 to 3

Liquid Compositions 2 to 12 and Comparative Liquid Compositions 1 to 3 were prepared in the same manner as in Example 1, except that the materials and their contents were changed according to Table 1. The surfactants used in the liquid compositions are shown in Table 2.

by the general formula. However, Comparative Surfactants 1 and 2 were not the compound expressed by the general formula.

Preparation of Intermediate Transfer Members 2 and 3 and Comparative Intermediate Transfer Member 1

Intermediate Transfer Members 2 and 3 and Comparative Intermediate Transfer member 1 were prepared in the same manner as Intermediate Transfer Member 1, except that each surface layer was formed of the corresponding material shown in Table 3.

TABLE 1

| | Reaction agent | | Neutralizer | | Surfactant | | Organic solvent | | Water | |
|---|---|---|---|---|---|---|---|---|---|---|
| | Type | Content (parts) | Type | Content (parts) | Type | Content (parts) | Type | Content (parts) | Content (parts) | pH |
| Liquid composition 1 | Levulinic acid | 40.0 | — | 0.0 | Surfactant 1 | 30.0 | 1,5-Pentanediol | 5.0 | 25.0 | 2 |
| Liquid composition 2 | Levulinic acid | 40.0 | — | 0.0 | Surfactant 2 | 30.0 | 1,5-Pentanediol | 5.0 | 25.0 | 2 |
| Liquid composition 3 | Levulinic acid | 40.0 | — | 0.0 | Surfactant 3 | 30.0 | 1,5-Pentanediol | 5.0 | 25.0 | 2 |
| Liquid composition 4 | Levulinic acid | 40.0 | — | 0.0 | Surfactant 4 | 30.0 | 1,5-Pentanediol | 5.0 | 25.0 | 2 |
| Liquid composition 5 | Levulinic acid | 40.0 | — | 0.0 | Surfactant 5 | 30.0 | 1,5-Pentanediol | 5.0 | 25.0 | 2 |
| Liquid composition 6 | Levulinic acid | 40.0 | — | 0.0 | Surfactant 6 | 30.0 | 1,5-Pentanediol | 5.0 | 25.0 | 2 |
| Liquid composition 7 | Levulinic acid | 40.0 | potassium hydroxide | 2.6 | Surfactant 1 | 30.0 | 1,5-Pentanediol | 5.0 | 22.4 | 4 |
| Liquid composition 8 | Levulinic acid | 40.0 | potassium hydroxide | 18.0 | Surfactant 1 | 30.0 | 1,5-Pentanediol | 5.0 | 7.0 | 6 |
| Liquid composition 9 | Levulinic acid | 40.0 | — | 0.0 | Surfactant 1 | 10.0 | 1,5-Pentanediol | 5.0 | 45.0 | 2 |
| Liquid composition 10 | Levulinic acid | 40.0 | — | 0.0 | Surfactant 1 | 3.0 | 1,5-Pentanediol | 5.0 | 52.0 | 2 |
| Liquid composition 11 | Levulinic acid | 40.0 | — | 0.0 | Surfactant 1 | 0.5 | 1,5-Pentanediol | 5.0 | 54.5 | 2 |
| Liquid composition 12 | calcium nitrate | 40.0 | — | 0.0 | Surfactant 1 | 30.0 | 1,5-Pentanediol | 5.0 | 25.0 | 5 |
| Comparative Liquid composition 1 | Levulinic acid | 40.0 | — | 0.0 | Comparative Surfactant 1 | 30.0 | 1,5-Pentanediol | 5.0 | 25.0 | 2 |
| Comparative Liquid composition 2 | Levulinic acid | 40.0 | — | 0.0 | Comparative Surfactant 2 | 30.0 | 1,5-Pentanediol | 5.0 | 25.0 | 2 |
| Comparative Liquid composition 3 | Levulinic acid | 40.0 | potassium hydroxide | 18.8 | Surfactant 1 | 30.0 | 1,5-Pentanediol | 5.0 | 6.2 | 7 |

TABLE 2

| | Surfactant | Molecular weight |
|---|---|---|
| Surfactant 1 | Side-chain polyether-modified siloxane Product name: BYK347 (BYK) | 1,500 |
| Surfactant 2 | Side-chain polyether-modified siloxane Product name: BYK348 (BYK) | 2,800 |
| Surfactant 3 | Side-chain polyether-modified siloxane Product name: BYK349 (BYK) | 2,600 |
| Surfactant 4 | Side-chain polyether-modified siloxane Product name: BYK3455 (BYK) | 3,300 |
| Surfactant 5 | Side-chain polyether-modified siloxane Product name: BYK331 (BYK) | 7,800 |
| Surfactant 6 | Side-chain polyether-modified siloxane Product name: BYK307(BYK) | 31,500 |
| Comparative Surfactant 1 | Terminal polyether-modified siloxane Product name: X-22-4272 (Shin-Etsu Chemical) | 4,200 |
| Comparative Surfactant 2 | Terminal polyether-modified siloxane Product name: BYK333(BYK) | 8,000 |

The surfactants were identified by $^{13}C$-NMR spectrometry (spectrometer: JNM-ECA 400 (product name), manufactured by JEOL), $^{1}H$-NMR spectrometry (spectrometer: JNM-ECA 400) and $^{29}Si$-NMR spectrometry (spectrometer: JNM-ECA 400), using HMBC ($^{1}H$-$^{13}C$) technique. As a result, it was confirmed that Surfactants 1 to 6 were compounds expressed by the general formula.

TABLE 3

| | Surface layer material | Contact angle with water |
|---|---|---|
| Intermediate transfer member 1 | Silicone rubber coated with siloxane compound surface layer | 50 degrees |
| Intermediate transfer member 2 | Silicone rubber (Siloxane compound) Product name: KE 12 (Shin-Etsu Chemical) | 100 degrees |
| Intermediate transfer member 3 | Silicone rubber coated with fluorine compound surface layer Product name: FSR-100 (Tigers Polymer) | 110 degrees |
| Comparative intermediate transfer member 1 | Plasma-treated urethane rubber | 30 degrees |

Recording of Images of Examples 2 to 16 and Comparative Examples 1 to 4

Images of Examples 2 to 16 and Comparative Examples 1 to 4 were recorded in the same manner as in Example 1, except that the liquid compositions and intermediate transfer members prepared above were used in combination shown in Table 4.

TABLE 4

| | Intermediate transfer member | Liquid composition |
|---|---|---|
| Example 1 | Intermediate transfer member 1 | Liquid composition 1 |
| Example 2 | Intermediate transfer member 1 | Liquid composition 2 |
| Example 3 | Intermediate transfer member 1 | Liquid composition 3 |
| Example 4 | Intermediate transfer member 1 | Liquid composition 4 |
| Example 5 | Intermediate transfer member 1 | Liquid composition 5 |
| Example 6 | Intermediate transfer member 1 | Liquid composition 6 |
| Example 7 | Intermediate transfer member 1 | Liquid composition 7 |
| Example 8 | Intermediate transfer member 1 | Liquid composition 8 |
| Example 9 | Intermediate transfer member 1 | Liquid composition 9 |
| Example 10 | Intermediate transfer member 1 | Liquid composition 10 |
| Example 11 | Intermediate transfer member 1 | Liquid composition 11 |
| Example 12 | Intermediate transfer member 1 | Liquid composition 12 |
| Example 13 | Intermediate transfer member 2 | Liquid composition 1 |
| Example 14 | Intermediate transfer member 3 | Liquid composition 1 |
| Comparative Example 1 | Intermediate transfer member 1 | Comparative liquid composition 1 |
| Comparative Example 2 | Intermediate transfer member 1 | Comparative liquid composition 2 |
| Comparative Example 3 | Intermediate transfer member 1 | Comparative liquid composition 3 |
| Comparative Example 4 | Comparative intermediate transfer member 1 | Liquid composition 1 |

Evaluation

Evaluation of Whether the Liquid Composition was Uniformly Applied to the Intermediate Transfer Member It was evaluated as below whether the liquid composition was uniformly applied in the step (a) of applying a liquid composition. Any region of 50 mm by 50 mm in area of the intermediate transfer member over which the liquid composition had been entirely applied was observed through an optical microscope, and the percentage of the area where the intermediate transfer member was exposed in the observed region was calculated. The results were evaluated according to the following criteria. Evaluation results are shown in Table 5.

A: Exposed area accounted for 0% or more and less than 2%.
B: Exposed area accounted for 2% or more and less than 5%.
C: Exposed area accounted for 5% or more and less than 10%.
D: Exposure areas accounted for 10% or more and less than 15%.
E: Exposure areas accounted for 15% or more and less than 25%.
F: Exposure areas accounted for 25% or more.

Evaluation of Non-Uniformity in Density of Intermediate Image

The non-uniformities in density of the intermediate images formed in the step (b) of forming an intermediate image in Examples and Comparative Examples were evaluated as below. Optical densities (O.D.) of about 40,000 points were measured every 0.1 mm square in any region of 20 mm by 20 mm in area with a plane spectrometer (PSA-700E, manufactured by JFE Techno Research). Then, the percentage of the number of points at which the measured O.D. value was in the range of "average of measured O.D. values−0.2" to "average of measured O.D. values+0.2" was calculated relative to the total number of measured points. The results were evaluated according to the following criteria. Evaluation results are shown in Table 5.

A: The percentage was 95% or more and 100% or less.
B: The percentage was 90% or more and less than 95%.
C: The percentage was 85% or more and less than 90%.
D: The percentage was 75% or more and less than 85%.
E: The percentage was less than 75%.

Evaluation of Transfer Certainty

The intermediate transfer member was observed through an optical microscope after the step (d) of transferring the intermediate image, and the transfer certainty of the intermediate image was evaluated from the ratio (residual area ratio) of the area of intermediate image remaining on the intermediate transfer member without being transferred to the area of the region of the intermediate transfer member to which an ink had been applied. The evaluation criteria were as follows, and evaluation results are shown in Table 5.

A: The residual area ratio was 0% or more and less than 10%.
B: The residual area ratio was 10% or more and less than 20%.
C: The residual area ratio was 20% or more.

TABLE 5

| | Whether the liquid was uniformly composition applied to the intermediate transfer member | Non-uniformity in Density | Transfer certainty |
|---|---|---|---|
| Example 1 | A | A | A |
| Example 2 | A | A | A |
| Example 3 | A | A | A |
| Example 4 | A | A | A |
| Example 5 | A | A | A |
| Example 6 | B | B | A |
| Example 7 | A | A | A |
| Example 8 | B | B | A |
| Example 9 | A | A | A |
| Example 10 | B | B | A |
| Example 11 | C | B | A |
| Example 12 | C | B | A |
| Example 13 | B | B | A |
| Example 14 | C | C | A |
| Comparative Example 1 | E | E | B |
| Comparative Example 2 | F | E | A |
| Comparative Example 3 | D | D | A |
| Comparative Example 4 | A | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-271677 filed Dec. 12, 2011, which is hereby incorporated by reference herein in its entirety.

What is claimed is:

1. An image recording method comprising:

applying a liquid composition to a region of an intermediate transfer member, the liquid composition containing a reaction agent that will precipitate or aggregate a coloring material contained in an ink;

forming an intermediate image by applying the ink to at least part of the region of the intermediate transfer member; and transferring the intermediate image to a recording medium, wherein the intermediate transfer member has a surface on which water forms a contact angle of 40 degrees or more with the surface of the intermediate transfer member, and the liquid composition has a pH of 6.0 or less and contains a polyether siloxane compound expressed by the following general formula:

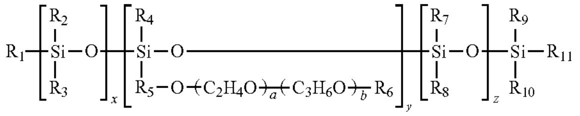

wherein $R_1$ to $R_4$ and $R_6$ to $R_{11}$ each represent hydrogen or an organic group, $R_5$ represents an organic group, x, y and a each represent an integer of 1 or more, and z and b each represent an integer of 0 or more.

2. The image recording method according to claim 1, wherein the content of the polyether siloxane compound in the liquid composition is 3.0% by mass or more.

3. The image recording method according to claim 1, wherein the polyether siloxane compound has a weight average molecular weight of 10,000 or less.

4. The image recording method according to claim 1, wherein the liquid composition has a pH of 4.0 or less.

* * * * *